US006775719B1

United States Patent
Leitner et al.

(10) Patent No.: US 6,775,719 B1
(45) Date of Patent: Aug. 10, 2004

(54) HOST-FABRIC ADAPTER AND METHOD OF CONNECTING A HOST SYSTEM TO A CHANNEL-BASED SWITCHED FABRIC IN A DATA NETWORK

(75) Inventors: Brian M. Leitner, Hillsboro, OR (US); Dominic J. Gasbarro, Forest Grove, OR (US); Jie Ni, Portland, OR (US); Tom E. Burton, Vancouver, WA (US); Richard D. Reohr, Jr., Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 576 days.

(21) Appl. No.: 09/671,703

(22) Filed: Sep. 28, 2000

(51) Int. Cl.$^7$ .............................................. G06F 13/00
(52) U.S. Cl. ......................... 710/33; 710/51; 370/399; 370/463
(58) Field of Search ................................ 710/4, 11, 33, 710/34, 35, 36, 40, 51, 263, 65; 370/392, 390, 418, 429, 395.43, 399, 463

(56) References Cited

U.S. PATENT DOCUMENTS

| | | | |
|---|---|---|---|
| 5,634,015 A | | 5/1997 | Chang et al. |
| 6,188,690 B1 | * | 2/2001 | Holden et al. ............... 370/390 |
| 6,243,787 B1 | | 6/2001 | Kagan et al. |
| 6,400,730 B1 | | 6/2002 | Latif et al. |
| 6,421,711 B1 | | 7/2002 | Blumenau et al. |
| 6,545,981 B1 | | 4/2003 | Garcia et al. |
| 6,557,060 B1 | * | 4/2003 | Haren .......................... 710/65 |
| 6,591,310 B1 | | 7/2003 | Johnson |
| 6,594,701 B1 | | 7/2003 | Forin |
| 6,668,299 B1 | | 12/2003 | Kagan et al. |
| 6,678,782 B1 | | 1/2004 | Aydemir et al. |
| 6,690,757 B1 | | 2/2004 | Bunton et al. |
| 2001/0053148 A1 | | 12/2001 | Billic et al. |
| 2002/0071450 A1 | | 6/2002 | Gasbarro et al. |
| 2003/0070014 A1 | | 4/2003 | Haren |

\* cited by examiner

Primary Examiner—Khanh Dang
(74) Attorney, Agent, or Firm—Schwegman, Lundberg, Woessner & Kluth, P.A.

(57) ABSTRACT

A host system is provided with one or more host-fabric adapters installed therein for connecting to a switched fabric of a data network. The host-fabric adapter comprises a host interface arranged to interface a host memory of the host system; a serial interface arranged to receive and transmit data from said switched fabric; a Micro-Engine (ME) arranged to work on multiple tasks based on a Virtual Interface (VI) to support data transfers via the switched fabric, and configured to issue a host request to said host interface for a host transaction including an address and length of host data to be fetched from the host memory, and an End-Of-Cell (EOC) indicator which indicates that a cell has been built for transmission via the serial interface, and to begin working on a different task without waiting for the corresponding host response of the host request from the host interface; a Scheduler arranged to supply a request and a request VI number to said Micro-Engine (ME) for work; and a Request Comparator arranged to check the current VI that is being worked on by the Micro-Engine (ME), and to generate an acknowledgment ACK or a negative acknowledgment NACK to the Scheduler depending upon whether the request VI number is currently being worked on by the Micro-Engine (ME).

27 Claims, 11 Drawing Sheets

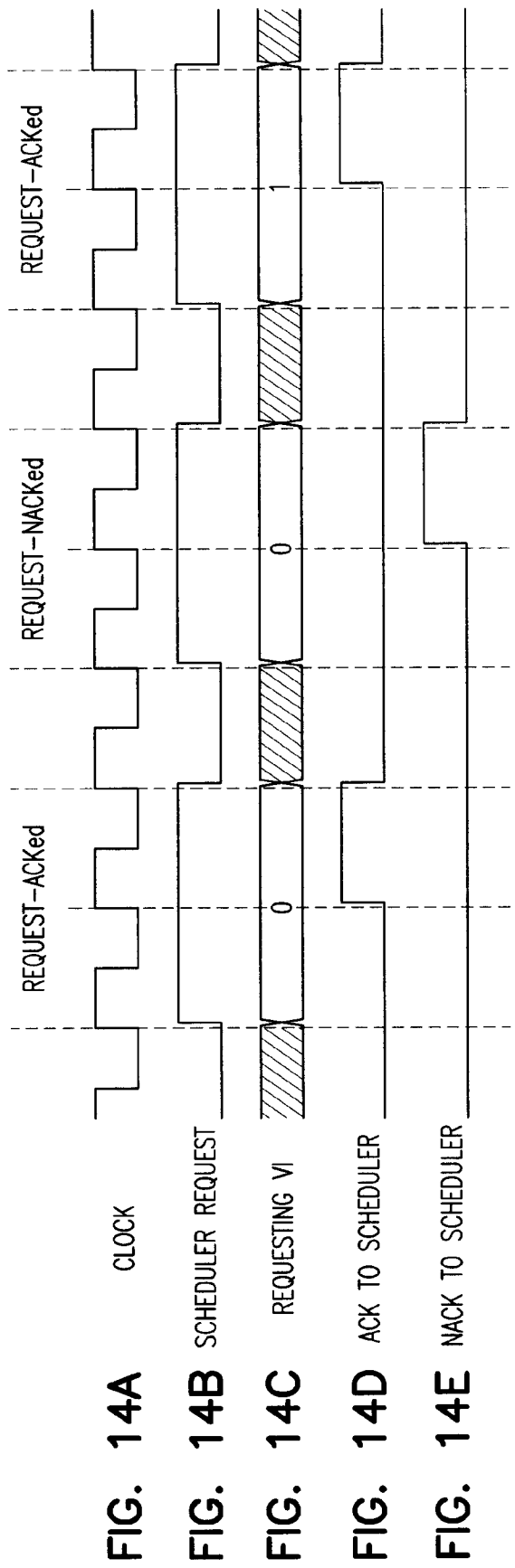

HOST-FABRIC ADAPTER AND METHOD OF CONNECTING A HOST SYSTEM TO A CHANNEL-BASED SWITCHED FABRIC IN A DATA NETWORK

TECHNICAL FIELD

The present invention relates to a data network, and more particularly, relates to a host-fabric adapter and a method of connecting a host system to a channel-based switched fabric in such a data network.

BACKGROUND

A data network generally consists of a network of multiple independent and clustered nodes connected by point-to-point links. Each node may be an intermediate node, such as a switch/switch element, a repeater, and a router, or an end-node within the network, such as a host system and an I/O unit (e.g., data servers, storage subsystems and network devices). Message data may be transmitted from source to destination, often through intermediate nodes.

Existing interconnect transport mechanisms, such as PCI (Peripheral Component Interconnect) buses as described in the "*PCI Local Bus Specification, Revision* 2.1" set forth by the PCI Special Interest Group (SIG) on Jun. 1, 1995, may be utilized to deliver message data to and from I/O devices, namely storage subsystems and network devices. However, PCI buses utilize a shared memory-mapped bus architecture that includes one or more shared I/O buses to deliver message data to and from storage subsystems and network devices. Shared I/O buses can pose serious performance limitations due to the bus arbitration required among storage and network peripherals as well as posing reliability, flexibility and scalability issues when additional storage and network peripherals are required. As a result, existing interconnect technologies have failed to keep pace with computer evolution and the increased demands generated and burden imposed on server clusters, application processing, and enterprise computing created by the rapid growth of the Internet.

Emerging solutions to the shortcomings of existing PCI bus architecture are InfiniBand™ and its predecessor, Next Generation I/O (NGIO) which have been developed by Intel Corporation to provide a standards-based I/O platform that uses a switched fabric and separate I/O channels instead of a shared memory-mapped bus architecture for reliable data transfers between end-nodes, as set forth in the "*Next Generation Input/Output (NGIO) Specification,*" NGIO Forum on Jul. 20, 1999 and the "*InfiniBand™ Architecture Specification,*" the InfiniBand™ Trade Association scheduled for publication in late October 2000. Using NGIO/InfiniBand™, a host system may communicate with one or more remote systems using a Virtual Interface (VI) architecture in compliance with the "*Virtual Interface (VI) Architecture Specification, Version* 1.0," as set forth by Compaq Corp., Intel Corp., and Microsoft Corp., on Dec. 16, 1997. NGIO/InfiniBand™ and VI hardware and software may often be used to support data transfers between two memory regions, typically on different systems over one or more designated channels. Each host system using a VI Architecture may contain work queues (WQ) formed in pairs including inbound and outbound queues in which requests, in the form of descriptors, are posted to describe data movement operation and location of data to be moved for processing and/or transportation via a data network. Each host system may serve as a source (initiator) system which initiates a message data transfer (message send operation) or a target system of a message passing operation (message receive operation). Requests for work (data movement operations such as message send/receive operations and remote direct memory access "RDMA" read/write operations) may be posted to work queues associated with a given network interface card. One or more channels between communication devices at a host system or between multiple host systems connected together directly or via a data network may be created and managed so that requested operations can be performed.

Since NGIO/InfiniBand™ is an emerging interconnect technology not yet in the marketplace, there is no known interface mechanism specifically implemented for NGIO/InfiniBand™ applications. There is no known network interface card (NIC) for a host system to connect to a data network using a channel-based, switched fabric architecture to support data movement operations between communication devices at a host system or between host systems connected together directly or via a data network. Existing network interface cards (NICs) for host systems are not adapted for emerging NGIO/InfiniBand™ interconnect technology and are, therefore, not optimized for NGIO/InfiniBand™ functionality.

Accordingly, there is a need for an especially designed and performance-driven host-fabric adapter installed at a host system in a data network using a channel-based, switched fabric architecture, and optimized for NGIO/InfiniBand™ functionality with minimal hardware investment, including controlling execution of NGIO/InfiniBand™ protocols with minimal pipelining and NGIO/InfiniBand™ cell data processing with minimal latency.

BRIEF DESCRIPTION OF THE DRAWINGS

A more complete appreciation of exemplary embodiments of the present invention, and many of the attendant advantages of the present invention, will be readily appreciated as the same becomes better understood by reference to the following detailed description when considered in conjunction with the accompanying drawings in which like reference symbols indicate the same or similar components, wherein:

FIGS. 14A–14E illustrate an example timing diagram of the Scheduler and Micro-Engine (ME) interaction using a negative acknowledgment (NACK) feature according to an embodiment of the present invention.

DETAILED DESCRIPTION

The present invention is applicable for use with all types of data networks, I/O hardware adapters and chipsets, including follow-on chip designs which link together end stations such as computers, servers, peripherals, storage subsystems, and communication devices for data communications. Examples of such data networks may include a local area network (LAN), a wide area network (WAN), a campus area network (CAN), a metropolitan area network (MAN), a global area network (GAN), a wireless personal area network (WPAN), and a system area network (SAN), including newly developed computer networks using Next Generation I/O (NGIO), Future I/O (FIO), InfiniBand™ and those networks including channel-based, switched fabric architectures which may become available as computer technology advances to provide scalable performance. LAN systems may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on a host system including one or more hardware fabric adapters for providing physical links for channel connections in a simple data network having several example nodes (e.g., computers, servers and I/O units) interconnected by corresponding links and switches, although the scope of the present invention is not limited thereto.

Figure 1:
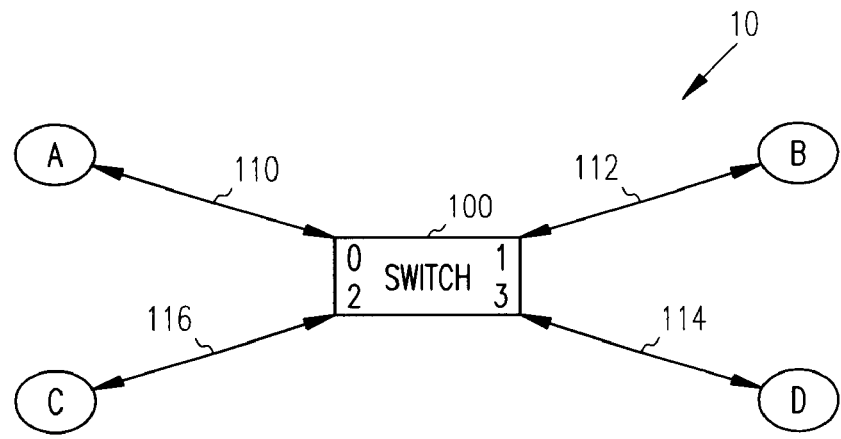
FIG. 1 illustrates an example data network having several nodes interconnected by corresponding links of a basic switch according to an embodiment of the present invention.

Attention now is directed to the drawings and particularly to FIG. 1, in which a simple data network 10 having several interconnected nodes for data communications according to an embodiment of the present invention is illustrated. As shown in FIG. 1, the data network 10 may include, for example, one or more centralized switches 100 and four different nodes A, B, C, and D. Each node (endpoint) may correspond to one or more I/O units and host systems including computers and/or servers on which a variety of applications or services are provided. I/O unit may include one or more processors, memory, one or more I/O controllers and other local I/O resources connected thereto, and can range in complexity from a single I/O device such as a local area network (LAN) adapter to large memory rich RAID subsystem. Each I/O controller (IOC) provides an I/O service or I/O function, and may operate to control one or more I/O devices such as storage devices (e.g., hard disk drive and tape drive) locally or remotely via a local area network (LAN) or a wide area network (WAN), for example.

The centralized switch 100 may contain, for example, switch ports 0, 1, 2, and 3 each connected to a corresponding node of the four different nodes A, B, C, and D via a corresponding physical link 110, 112, 114, and 116. Each physical link may support a number of logical point-to-point channels. Each channel may be a bi-directional communication path for allowing commands and data to flow between two connected nodes (e.g., host systems, switch/switch elements, and I/O units) within the network.

Each channel may refer to a single point-to-point connection where data may be transferred between endpoints (e.g., host systems and I/O units). The centralized switch 100 may also contain routing information using, for example, explicit routing and/or destination address routing for routing data from a source node (data transmitter) to a target node (data receiver) via corresponding link(s), and re-routing information for redundancy.

Figure 11:
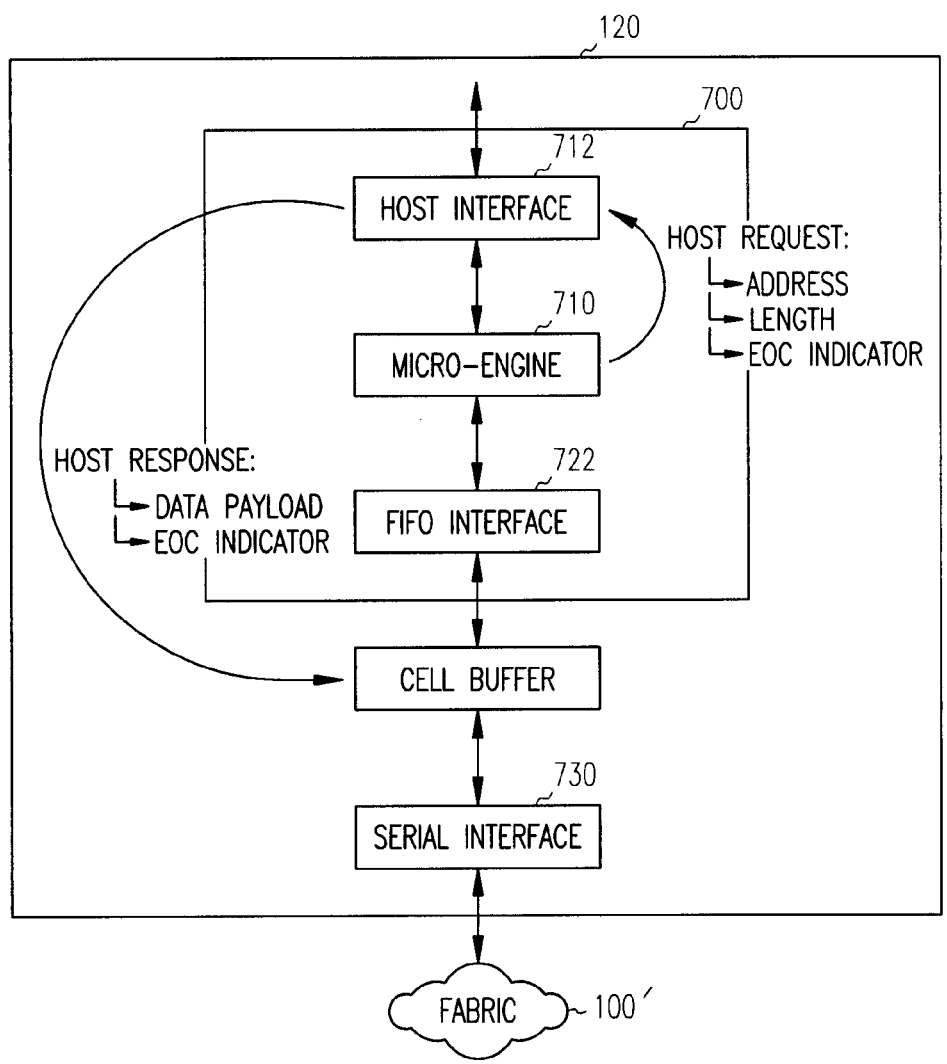
FIG. 11 illustrates an example host interface and Micro-Engine (ME) interaction using an End-Of-Cell (EOC) indicator feature according to an embodiment of the present invention.

The specific number and configuration of endpoints or end stations (e.g., host systems and I/O units), switches and links shown in FIG. 11 is provided simply as an example data network. A wide variety of implementations and arrangements of a number of end stations (e.g., host systems and I/O units), switches and links in all types of data networks may be possible.

According to an example embodiment or implementation, the endpoints or end stations (e.g., host systems and I/O units) of the example data network shown in FIG. 1 may be compatible with the "*Next Generation Input/Output (NGIO) Specification*" as set forth by the NGIO Forum on Jul. 20, 1999, and the "*InfiniBand™ Architecture Specification*" as set forth by the InfiniBand™ Trade Association scheduled for late October 2000. According to the NGIO/InfiniBand™ Specification, the switch 100 may be an NGIO/InfiniBand™ switched fabric (e.g., collection of links, routers, switches and/or switch elements connecting a number of host systems and I/O units), and the endpoint may be a host system including one or more host channel adapters (HCAs), or a remote system such as an I/O unit including one or more target channel adapters (TCAs). Both the host channel adapter (HCA) and the target channel adapter (TCA) may be broadly considered as fabric adapters provided to interface endpoints to the NGIO switched fabric, and may be implemented in compliance with "*Next Generation I/O Link Architecture Specification: HCA Specification, Revision* 1.0" as set forth by NGIO Forum on May 13, 1999, and/or the *InfiniBand™ Specification* for enabling the endpoints (nodes) to communicate to each other over an NGIO/InfiniBand™ channel(s).

Figure 2:
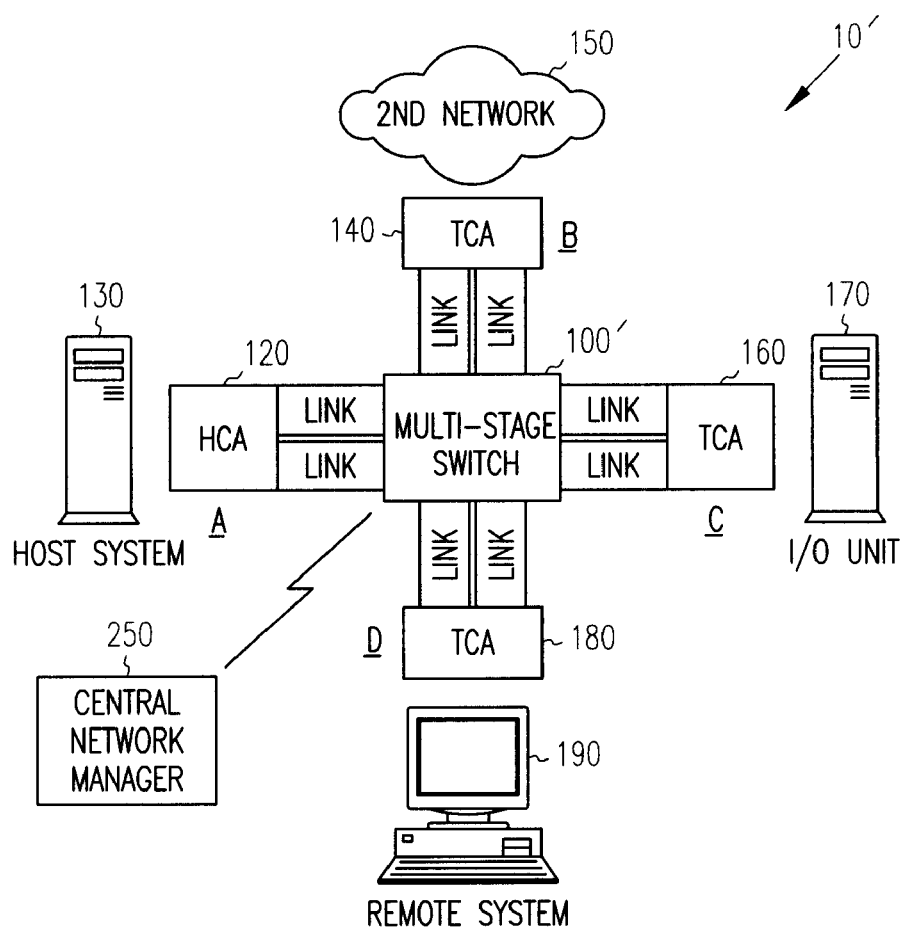
FIG. 2 illustrates another example data network having several nodes interconnected by corresponding links of a multi-stage switched fabric according to an embodiment of the present invention.

For example, FIG. 2 illustrates an example data network (i.e., system area network SAN) 10' using an NGIO/InfiniBand™ architecture to transfer message data from a source node to a destination node according to an embodiment of the present invention. As shown in FIG. 2, the data network 10' includes an NGIO/InfiniBand™ switched fabric 100' (multi-stage switched fabric comprised of a plurality of switches) for allowing a host system and a remote system to communicate to a large number of other host systems and remote systems over one or more designated channels. A channel connection is simply an abstraction that is established over a switched fabric 100' to allow two work queue pairs (WQPs) at source and destination endpoints (e.g., host and remote systems, and IO units that are connected to the switched fabric 100') to communicate to each other. Each channel can support one of several different connection semantics. Physically, a channel may be bound to a hardware port of a host system. Each channel may be acknowledged or unacknowledged. Acknowledged channels may provide reliable transmission of messages and data as well as information about errors detected at the remote end of the channel. Typically, a single channel between the host system and any one of the remote systems may be sufficient but data transfer spread between adjacent ports can decrease latency and increase bandwidth. Therefore, separate channels for separate control flow and data flow may be desired. For example, one channel may be created for sending request and reply messages. A separate channel or set of channels may be created for moving data between the host system and any one of the remote systems. In addition, any number of end stations, switches and links may be used for relaying data in groups of cells between the end stations and switches via corresponding NGIO/InfiniBand™ links.

For example, node A may represent a host system 130 such as a host computer or a host server on which a variety of applications or services are provided. Similarly, node B may represent another network 150, including, but may not be limited to, local area network (LAN), wide area network (WAN), Ethernet, ATM and fibre channel network, that is connected via high speed serial links. Node C may represent an I/O unit 170, including one or more I/O controllers and I/O units connected thereto. Likewise, node D may represent a remote system 190 such as a target computer or a target server on which a variety of applications or services are provided. Alternatively, nodes A, B, C, and D may also represent individual switches of the NGIO fabric 100' which serve as intermediate nodes between the host system 130 and the remote systems 150, 170 and 190.

The multi-stage switched fabric 100' may include a fabric manager 250 connected to all the switches for managing all network management functions. However, the fabric manager 250 may alternatively be incorporated as part of either the host system 130, the second network 150, the I/O unit 170, or the remote system 190 for managing all network management functions. In either situation, the fabric manager 250 may be configured for learning network topology, determining the switch table or forwarding database, detecting and managing faults or link failures in the network and performing other network management functions.

Host channel adapter (HCA) 120 may be used to provide an interface between a memory controller (not shown) of the host system 130 (e.g., servers) and a switched fabric 100' via high speed serial NGIO/InfiniBand™ links. Similarly, target channel adapters (TCA) 140 and 160 may be used to provide an interface between the multi-stage switched fabric 100' and an I/O controller (e.g., storage and networking devices) of either a second network 150 or an I/O unit 170 via high speed serial NGIO/InfiniBand™ links. Separately, another target channel adapter (TCA) 180 may be used to provide an interface between a memory controller (not shown) of the remote system 190 and the switched fabric 100' via high speed serial NGIO/InfiniBand™ links. Both the host channel adapter (HCA) and the target channel adapter (TCA) may be broadly considered as fabric adapters provided to interface either the host system 130 or any one of the remote systems 150, 170 and 190 to the switched fabric 100', and may be implemented in compliance with "Next Generation I/O Link Architecture Specification: HCA Specification, Revision 1.0" as set forth by NGIO Forum on May 13, 1999 for enabling the endpoints (nodes) to communicate to each other over an NGIO/InfiniBand™ channel(s). However, NGIO/InfiniBand™ is merely one example embodiment or implementation of the present invention, and the invention is not limited thereto. Rather, the present invention may be applicable to a wide variety of any number of data networks, hosts and I/O units. For example, practice of the invention may also be made with Future Input/Output (FIO). FIO specifications have not yet been released, owing to subsequent merger agreement of NGIO and FIO factions combine efforts on InfiniBand™ Architecture specifications as set forth by the InfiniBand Trade Association (formed Aug. 27, 1999) having an Internet address of "http://www.InfiniBandta.org."

Figure 3:
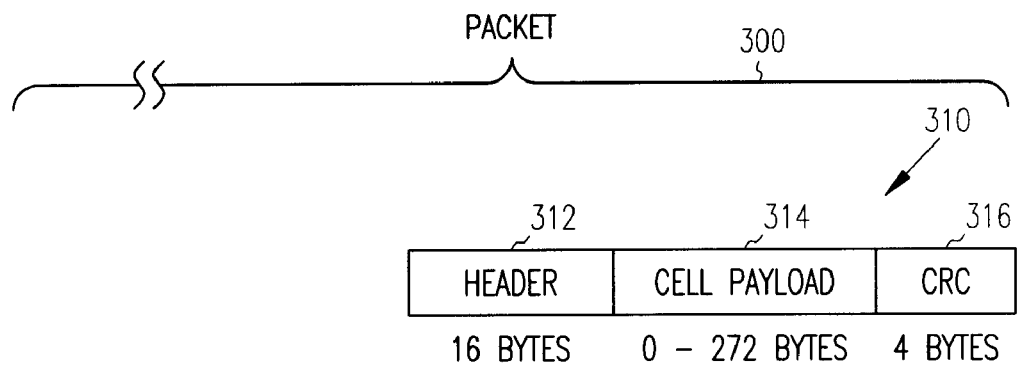
FIG. 3 illustrates packet and cell formats of data transmitted from a source node to a destination node in an example data network according to an embodiment of the present invention.

FIG. 3 illustrates an embodiment of packet and cell formats of message data transmitted from a source node (data transmitter) to a destination node (data receiver) through switches and/or intermediate nodes according to the "Next Generation I/O Link Architecture Specification" as set forth by the NGIO Forum on Mar. 26, 1999. As shown in FIG. 3, a data packet 300 may represent a sequence of one or more data cells 310. Each cell 310 may include different types of format header information 312, a variable format cell payload 314 and a cyclic redundancy check (CRC) information 316. Under the "InfiniBand™ Architecture Specification" as set forth by the InfiniBand™ Trade Association scheduled for late October 2000, the same data cells may be referred to as data packets as the least common denominator (LCD) of message data. Therefore, data cells and data packets may be interchangeable. However, for purposes of this disclosure the least common denominator (LCD) of message data may be referred as a data cell as shown in FIG. 3.

The header information 312 may consist of media control access information which specifies cell formation, format and validation and different types of headers, for example, routing header and transport header. Transport header may be extended to include additional transport fields, such as Virtual Address (VA) (not shown) and Memory Handle (MH) (not shown) for remote direct memory access (RDMA) operations (e.g., read and write operations).

Each cell payload may provide appropriate packet fields and up to 256 bytes of data payload. The cell CRC may consist of 4-bytes of checksum for all of the data in the cell. Accordingly, the maximum size cell as defined by NGIO specification, for example, may be, but not limited to, 292 bytes (256-byte Data Payload, 16-byte Header, 16-Byte Virtual Address/Immediate data, and 4-byte CRC). Under the InfiniBand™ specification, the maximum packet size may be larger than the maximum cell size as described with reference to FIG. 3.

Signaling protocols for NGIO/InfiniBand™ links may contain code groups for signaling the beginning and end of a cell/packet and for the gap between cells/packets, and code groups for controlling the flow of cells/packets across the link. For example, Start of Cell (SOC) and End of Cell (EOC) delimiters, inter-cell flow control sequences (Comma character and associated flow control character) and IDLE characters may be taken into account to determine the maximum defined period between IDLE characters.

Figure 4A:
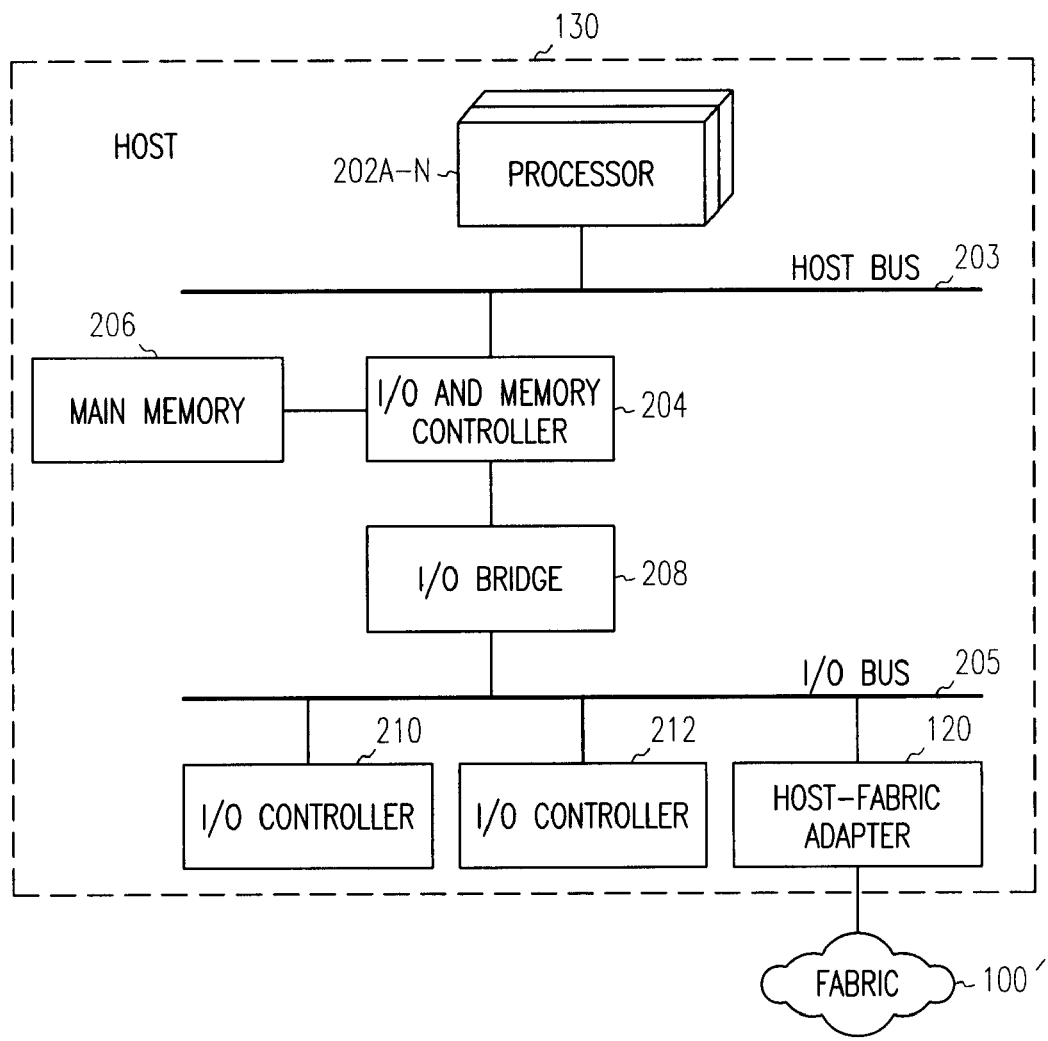
FIGS. 4A–4B illustrate a block diagram of an example host system of an example data network according to different embodiments of the present invention.

Returning to discussion, one example embodiment of a host system 130 may be shown in FIG. 4A. Referring to FIG.

4A, the host system 130 may include one or more processors 202A–202N coupled to a host bus 203. Each of the multiple processors 202A–202N may operate on a single item (I/O operation), and all of the multiple processors 202A–202N may operate on multiple items on a list at the same time. An I/O and memory controller 204 (or chipset) may be connected to the host bus 203. A main memory 206 may be connected to the I/O and memory controller 204. An I/O bridge 208 may operate to bridge or interface between the I/O and memory controller 204 and an I/O bus 205. Several I/O controllers may be attached to I/O bus 205, including an I/O controllers 210 and 212. I/O controllers 210 and 212 (including any I/O devices connected thereto) may provide bus-based I/O resources.

Figure 4B:
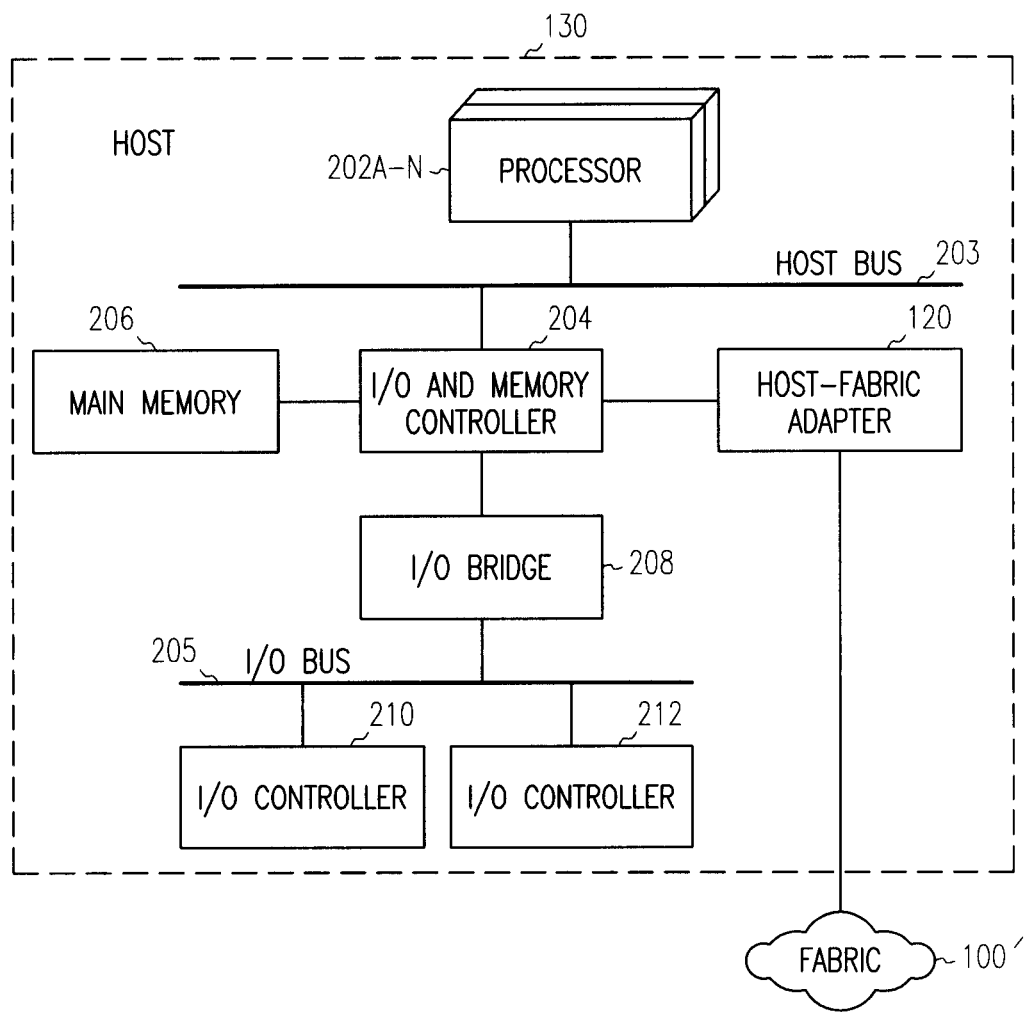

One or more host-fabric adapters 120 may also be connected to the I/O bus 205. Alternatively, one or more host-fabric adapters 120 may be connected directly to the I/O and memory controller (or chipset) 204 to avoid the inherent limitations of the I/O bus 205 as shown in FIG. 4B. In either embodiment shown in FIGS. 4A–4B, one or more host-fabric adapters 120 may be provided to interface the host system 130 to the NGIO switched fabric 100'.

FIGS. 4A–4B merely illustrate example embodiments of a host system 130. A wide array of system configurations of such a host system 130 may be available. A software driver stack for the host-fabric adapter 120 may also be provided to allow the host system 130 to exchange message data with one or more remote systems 150, 170 and 190 via the switched fabric 100', while preferably being compatible with many currently available operating systems, such as Windows 2000.

Figure 5:
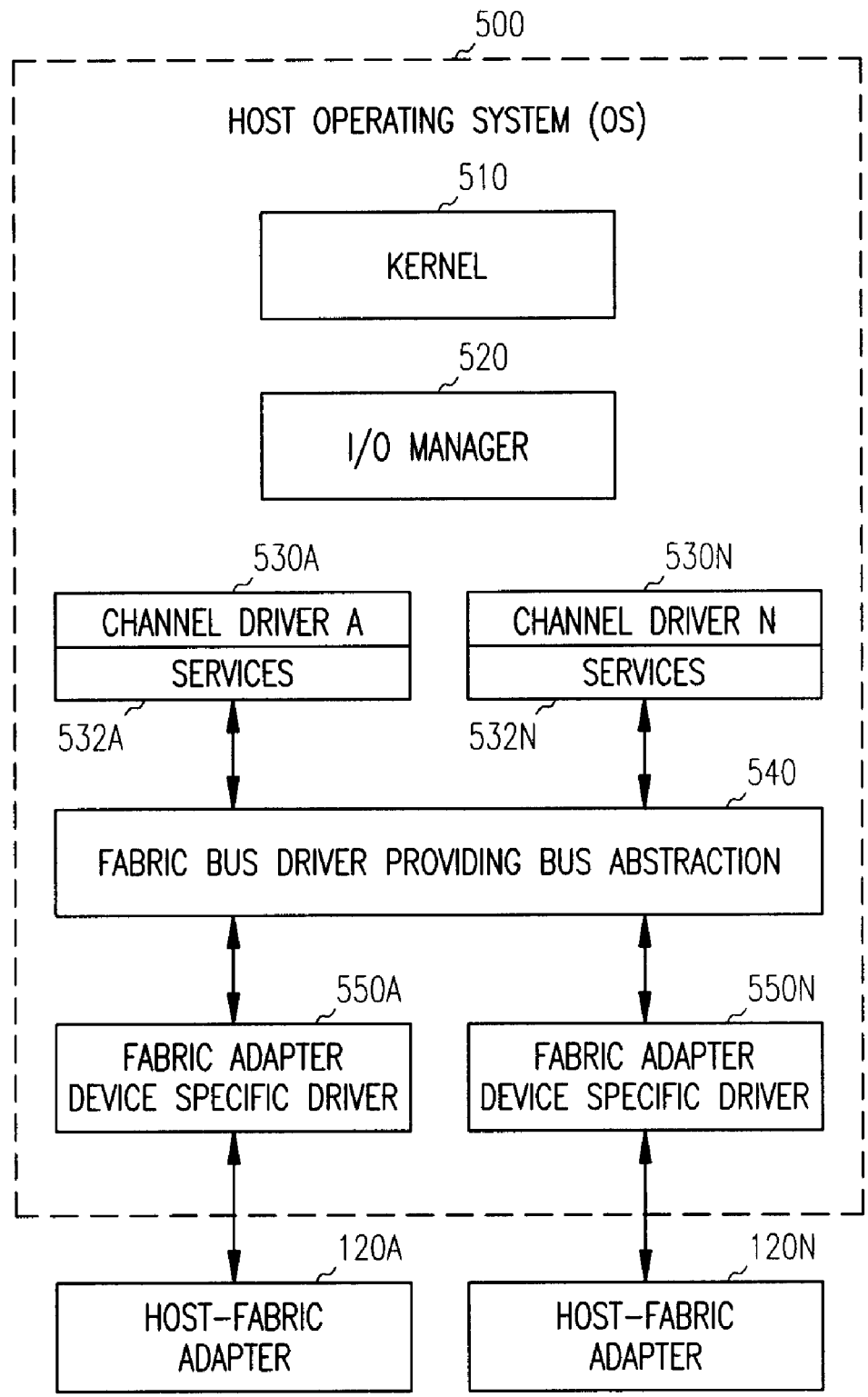
FIG. 5 illustrates an example software driver stack of an operating system (OS) of a host system according to an embodiment of the present invention.

FIG. 5 illustrates an example software driver stack of a host system 130. As shown in FIG. 5, a host operating system (OS) 500 may include a kernel 510, an I/O manager 520, a plurality of channel drivers 530A–530N for providing an interface to various I/O controllers, and a host-fabric adapter software stack (driver module) including a fabric bus driver 540 and one or more fabric adapter device-specific drivers 550A–550N utilized to establish communication with devices attached to the switched fabric 100' (e.g., I/O controllers), and perform functions common to most drivers. Such a host operating system (OS) 500 may be Windows 2000, for example, and the I/O manager 520 may be a Plug-n-Play manager.

Channel drivers 530A–530N provide the abstraction necessary to the host operating system (OS) to perform IO operations to devices attached to the switched fabric 100', and encapsulate IO requests from the host operating system (OS) and send the same to the attached device(s) across the switched fabric 100'. In addition, the channel drivers 530A–530N also allocate necessary resources such as memory and Work Queues (WQ) pairs, to post work items to fabric-attached devices.

The host-fabric adapter software stack (driver module) may be provided to access the switched fabric 100' and information about fabric configuration, fabric topology and connection information. Such a host-fabric adapter software stack (driver module) may be utilized to establish communication with a remote system (e.g., I/O controller), and perform functions common to most drivers, including, for example, host-fabric adapter initialization and configuration, channel configuration, channel abstraction, resource management, fabric management service and operations, send/receive IO transaction messages, remote direct memory access (RDMA) transactions (e.g., read and write operations), queue management, memory registration, descriptor management, message flow control, and transient error handling and recovery. Such software driver module may be written using high-level programming languages such as C, C++ and Visual Basic, and may be provided on a computer tangible medium, such as memory devices; magnetic disks (fixed, floppy, and removable); other magnetic media such as magnetic tapes; optical media such as CD-ROM disks, or via Internet downloads, which may be available for a fabric administrator to conveniently plug-in or download into an existing operating system (OS). Such a software driver module may also be bundled with the existing operating system (OS) which may be activated by a particular device driver.

The host-fabric adapter (HCA) driver module may consist of three functional layers: a HCA services layer (HSL), a HCA abstraction layer (HCAAL), and a HCA device-specific driver (HDSD) in compliance with the "*Next Generation I/O Architecture: Host Channel Adapter Software Specification*", the "*Next Generation I/O: Intel HCA Connection Services Layer High Level Design*", the "*Next Generation I/O: Intel HCA Abstraction Layer High Level Design*", and the "*Next Generation I/O: Intel HCA Fabric Services Layer High Level Design*" as set forth by Intel on Aug. 6, 1999 For instance, inherent to all channel drivers 530A–530N may be a Channel Access Layer (CAL) including a HCA Service Layer (HSL) for providing a set of common services 532A–532N, including fabric services, connection services, and HCA services required by the channel drivers 530A–530N to instantiate and use NGIO/InfiniBand™ protocols for performing data transfers over NGIO/InfiniBand™ channels. The fabric bus driver 540 may correspond to the HCA Abstraction Layer (HCAAL) for managing all of the device-specific drivers, controlling shared resources common to all HCAs in a host system 130 and resources specific to each HCA in a host system 130, distributing event information to the HSL and controlling access to specific device functions. Likewise, one or more fabric adapter device-specific drivers 550A–550N may correspond to HCA device-specific drivers (for all type of brand X devices and all type of brand Y devices) for providing an abstract interface to all of the initialization, configuration and control interfaces of one or more HCAs. Multiple HCA device-specific drivers may be present when there are HCAs of different brands of devices in a host system 130.

More specifically, the fabric bus driver 540 or the HCA Abstraction Layer (HCAAL) may provide all necessary services to the host-fabric adapter software stack (driver module), including, for example, to configure and initialize the resources common to all HCAs within a host system, to coordinate configuration and initialization of HCAs with the HCA device-specific drivers, to control access to the resources common to all HCAs, to control access the resources provided by each HCA, and to distribute event notifications from the HCAs to the HCA Services Layer (HSL) of the Channel Access Layer (CAL). In addition, the fabric bus driver 540 or the HCA Abstraction Layer (HCAAL) may also export client management functions, resource query functions, resource allocation functions, and resource configuration and control functions to the HCA Service Layer (HSL), and event and error notification functions to the HCA device-specific drivers. Resource query functions include, for example, query for the attributes of resources common to all HCAs and individual HCA, the status of a port, and the configuration of a port, a work queue pair (WQP), and a completion queue (CQ). Resource allocation functions include, for example, reserve and release of the control interface of a HCA and ports, protection tags, work queue pairs (WQPs), completion queues (CQs). Resource configuration and control functions include, for example, configure a port, perform a HCA control operation and a port control operation, configure a work queue pair (WQP), perform an operation on the send or receive work queue of a work queue pair (WQP), configure a completion queue (CQ), and perform an operation on a completion queue (CQ).

The host system 130 may communicate with one or more remote systems 150, 170 and 190, including I/O units and I/O controllers (and attached I/O devices) which are directly attached to the switched fabric 100' (i.e., the fabric-attached I/O controllers) using a Virtual Interface (VI) architecture in compliance with the *"Virtual Interface (VI) Architecture Specification, Version 1.0,"* as set forth by Compaq Corp., Intel Corp., and Microsoft Corp., on Dec. 16, 1997. VI architecture may support data transfers between two memory regions, typically on different systems over one or more designated channels of a data network. Each system using a VI Architecture may contain work queues (WQ) formed in pairs including inbound (receive) and outbound (send) queues in which requests, in the form of descriptors, are posted to describe data movement operation and location of data to be moved for processing and/or transportation via a switched fabric 100'. The VI Specification defines VI mechanisms for low-latency, high-bandwidth message-passing between interconnected nodes connected by multiple logical point-to-point channels. However, other architectures may also be used to implement the present invention.

Figure 6:
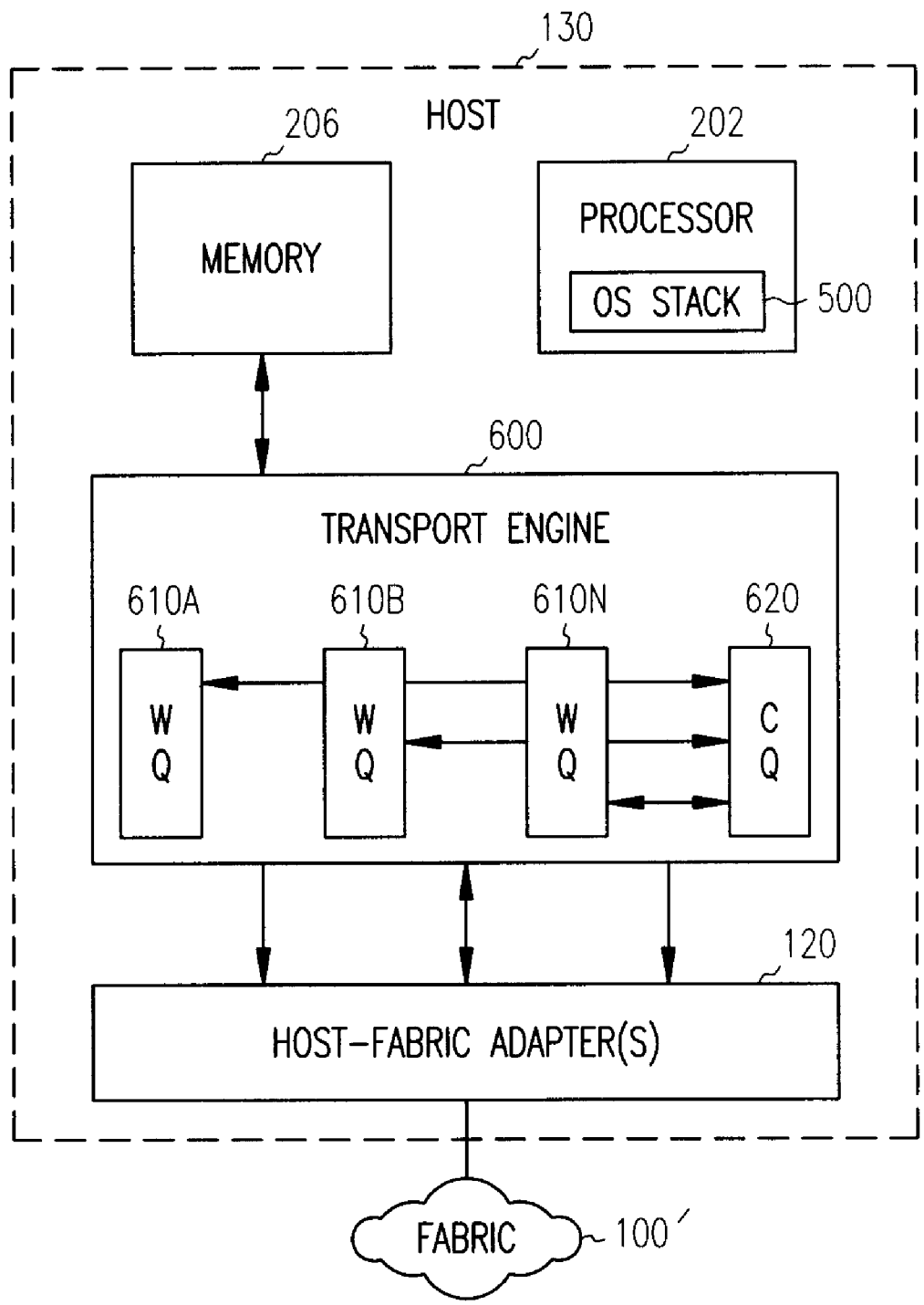
FIG. 6 illustrates a block diagram of an example host system using NGIO/InfiniBand™ and VI architectures to support data transfers via a switched fabric according to an embodiment of the present invention.

FIG. 6 illustrates an example host system using NGIO/InfiniBand™ and VI architectures to support data transfers via a switched fabric 100'. As shown in FIG. 6, the host system 130 may include, in addition to one or more processors 202 containing an operating system (OS) stack 500, a host memory 206, and at least one host-fabric adapter (HCA) 120 as shown in FIGS. 2, 4A, 4B and 5, a transport engine 600 provided in the host-fabric adapter (HCA) 120 in accordance with NGIO/InfiniBand™ and VI architectures for data transfers via a switched fabric 100'. One or more host-fabric adapters (HCAs) 120 may be advantageously utilized to expand the number of ports available for redundancy and multiple switched fabrics.

As shown in FIG. 6, the transport engine 600 may contain a plurality of work queues (WQ) formed in pairs including inbound (receive) and outbound (send) queues, such as work queues (WQ) 610A–610N in which requests, in the form of descriptors, may be posted to describe data movement operation and location of data to be moved for processing and/or transportation via a switched fabric 100', and completion queues (CQ) 620 may be used for the notification of work request completions. Alternatively, such a transport engine 600 may be hardware memory components of a host memory 206 which resides separately from the host-fabric adapter (HCA) 120 so as to process completions from multiple host-fabric adapters (HCAs) 120, or may be provided as part of kernel-level device drivers of a host operating system (OS). In one embodiment, each work queue pair (WQP) including separate inbound (receive) and outbound (send) queues has a physical port into a switched fabric 100' via a host-fabric adapter (HCA) 120. However, in other embodiments, all work queues may share physical ports into a switched fabric 100' via one or more host-fabric adapters (HCAs) 120. The outbound queue of the work queue pair (WQP) may be used to request, for example, message sends, remote direct memory access "RDMA" reads, and remote direct memory access "RDMA" writes. The inbound (receive) queue may be used to receive messages.

In such an example data network, NGIO/InfiniBand™ and VI hardware and software may be used to support data transfers between two memory regions, often on different systems, via a switched fabric 100'. Each host system may serve as a source (initiator) system which initiates a message data transfer (message send operation) or a target system of a message passing operation (message receive operation). Examples of such a host system include host servers providing a variety of applications or services and I/O units providing storage oriented and network oriented IO services. Requests for work (data movement operations such as message send/receive operations and RDMA read/write operations) may be posted to work queues (WQ) 610A–610N associated with a given fabric adapter (HCA), one or more channels may be created and effectively managed so that requested operations can be performed.

Figure 7:
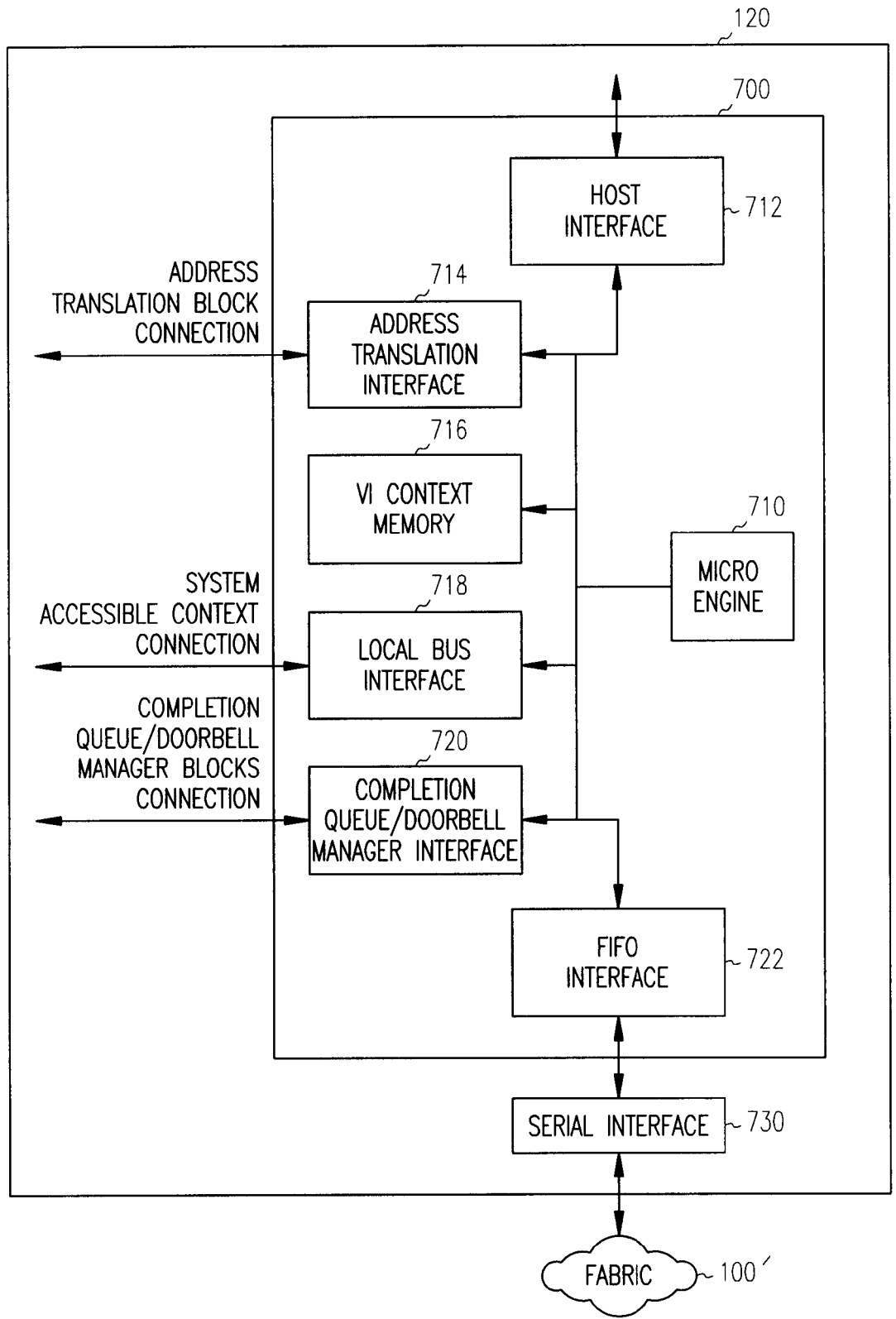
FIG. 7 illustrates an example host-fabric adapter configured in accordance with NGIO/InfiniBand™ and VI architectures to support data transfers via a switched fabric 100' according to an embodiment of the present invention.

Turning now to FIG. 7, an example host-fabric adapter 120 installed at a host system and configured in accordance with NGIO/InfiniBand™ architectures to support data transfers via a switched fabric 100' according to an embodiment of the present invention is illustrated. The example host-fabric adapter 120 is especially designed to connect a host system to a channel-based switched fabric 100' of a data network 100 for services to efficiently establish and manage NGIO/InfiniBand™ channels and support data movement operations between communication devices at a host system or between host systems connected together directly or via the data network 100' using a channel-based, switched fabric architecture. In addition, the host-fabric adapter 120 implements hardware designed for increased performance and efficiency, and optimized for NGIO/InfiniBand™ functionality with minimal hardware investment, including controlling execution of NGIO/InfiniBand™ protocols with minimal pipelining and NGIO/InfiniBand™ cell data processing with minimal latency.

As shown in FIG. 7, the host-fabric adapter 120 may include a micro-controller subsystem 700 which controls the execution of the NGIO/InfiniBand™ protocols, and a serial interface 730 which provides an interface with the switched fabric 100'. The micro-controller subsystem 700 contains one or more programmable direct-memory-access (DMA) engine(s) known as a Micro-Engine (ME) 710 utilized to build, send, receive and acknowledge NGIO/InfiniBand™ cells between the host memory 206 (see FIG. 6) and a serial link, and special purpose hardware interface logic blocks such as a host interface 712, an address translation interface 714, a VI context memory interface 716, a local bus interface 718, a completion queue/doorbell manager interface 720, and a first-in/first-out (FIFO) interface 722 controlled by the Micro-Engine (ME) 710 to perform many ME functions needed to implement the NGIO/InfiniBand™ and VI specifications, including, for example, host transactions, context updates, physical address translations, host descriptor fetches, doorbell management, FIFO data movements and completion queue management.

The Micro-Engine (ME) 710 may execute MicroCode to coordinate send queue and receive queue operations for transmitting and receiving NGIO/InfiniBand™ cells and to support completion queues and channels in compliance with the NGIO/InfiniBand protocols. The Micro-Engine (ME) 710 may also control all the interface blocks through a set of micro register reads and writes. Micro registers may be available with data supplied by multiple interface blocks to help speed up MicroCode functions.

The host interface 712 provides an interface to either an I/O bus 205 of a host system 130 as shown in FIG. 4A, or an I/O and memory controller 204 of a host system 130 as shown in FIG. 4B for host transactions, including controlling arbitration and data/control multiplexing between different requesters, read and write transactions to the host system 130 and facilitating read completions.

The address translation interface 714 provides an interface to an address translation block (not shown) responsible for managing the conversion of virtual address (used to address program space) to physical addresses (used to address system space) and validating access to memory.

The context memory interface 716 provides an interface to a context manager (not shown) responsible for providing the necessary context for a work queue pair (WQP) used for sending and receiving a data cell/packet. The context memory interface 716 also provides an interface to host software and presents different types of memory mapped register sets which specify channel configurations and to initiate channel operations. For example, the memory mapped register sets may include global HCA context registers which affect the operation of work queues, work queue pair registers which control the establishment of channels, and completion queue registers which specify the location and length of a completion queue in host memory and control whether interrupts are generated when completion queues entries are written.

The local bus interface 718 provides an interface to a local data bus responsible for supporting system accessible context connections and channel operations, and for turning the signal data into appropriate forms for the Micro-Engine (ME) 710, including MicroCode loading.

The completion queue/doorbell manager interface 720 provides an interface to completion queues, and doorbell manager and memory registration rules of the VI architecture.

The FIFO interface 722 provides an interface to the serial interface 730. The FIFO interface 722 may include a Receive FIFO interface 722A arranged to receive request(s) and/or data packet(s) from the switched fabric 100' via a Receive FIFO and a serial interface 730, and a Transmit FIFO interface 722B arranged to send request(s) and/or data packet(s) to the switched fabric 100' via a serial interface 730.

The Receive FIFO interface 722A may be used by the Micro-Engine (ME) 710 to process the incoming cell, via the serial interface 730, including checking the cell header for errors and checking if additional data needs to be read before passing the same to the host interface 712. The Transmit FIFO interface 722B may be used by the Micro-Engine (ME) 710 to build cells for subsequent transmission, via the serial interface 730.

In addition, a Scheduler (not shown) may also be included for scheduling the next Virtual Interface (VI) to the context manager and supporting priority of traffic for data cells or packets associated with send work queues and receive work queues. Such a Scheduler may be provided to interface with the context memory interface 716, the local bus interface 718 and the completion queue/doorbell manager interface 720 for scheduled functions.

Figure 8:
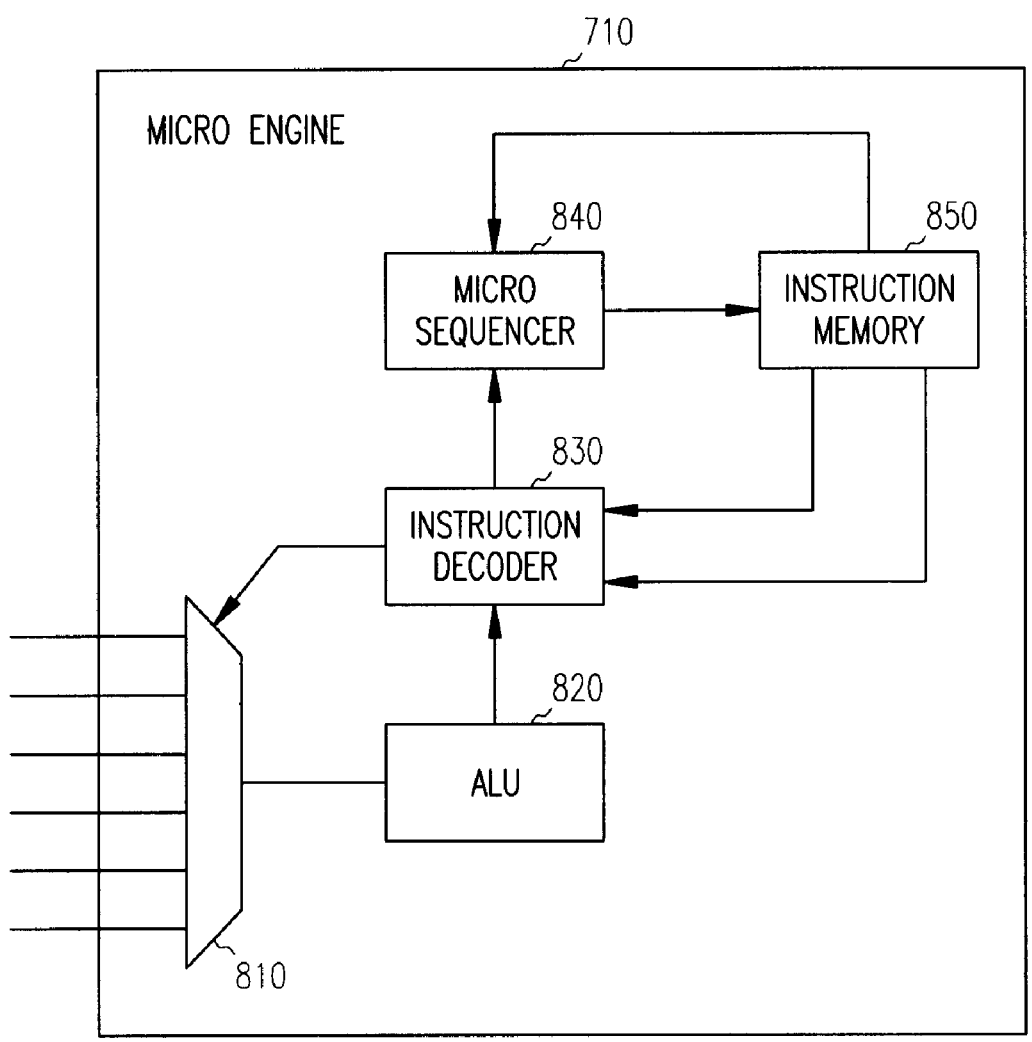
FIG. 8 illustrates an example Micro-Engine (ME) of a host-fabric adapter according to an embodiment of the present invention.

FIG. 8 illustrates a general example Micro-Engine (ME) 710 configured to handle multiple independent operations (known as tasks) for performance efficiency with minimum hardware investment according to an embodiment of the present invention. As shown in FIG. 8, the Micro-Engine (ME) 710 may comprise one or more Data Multiplexers (MUXs) 810, an Arithmetic Logic Unit (ALU) 820, an Instruction Decoder 830, a Micro-Sequencer 840, and an Instruction Memory 850. The Instruction Memory 850 may store downloadable MicroCode for ME instructions. The data MUXs 810 may supply appropriate interface data based on ME instructions. The Arithmetic Logic Unit (ALU) 820 may perform any mathematical, logical and shifting operations. The Instruction Decoder 830 may supply system controls to the Micro-Sequencer 840 to determine the next instruction or address to be executed, execute ME instructions from the Instruction Memory 850, and determine the functions of the ALU 820. The Micro-Sequencer 840 may check the sequence of ME instructions and determine which next instruction is to be executed by the Instruction Decoder 820.

Figure 9:
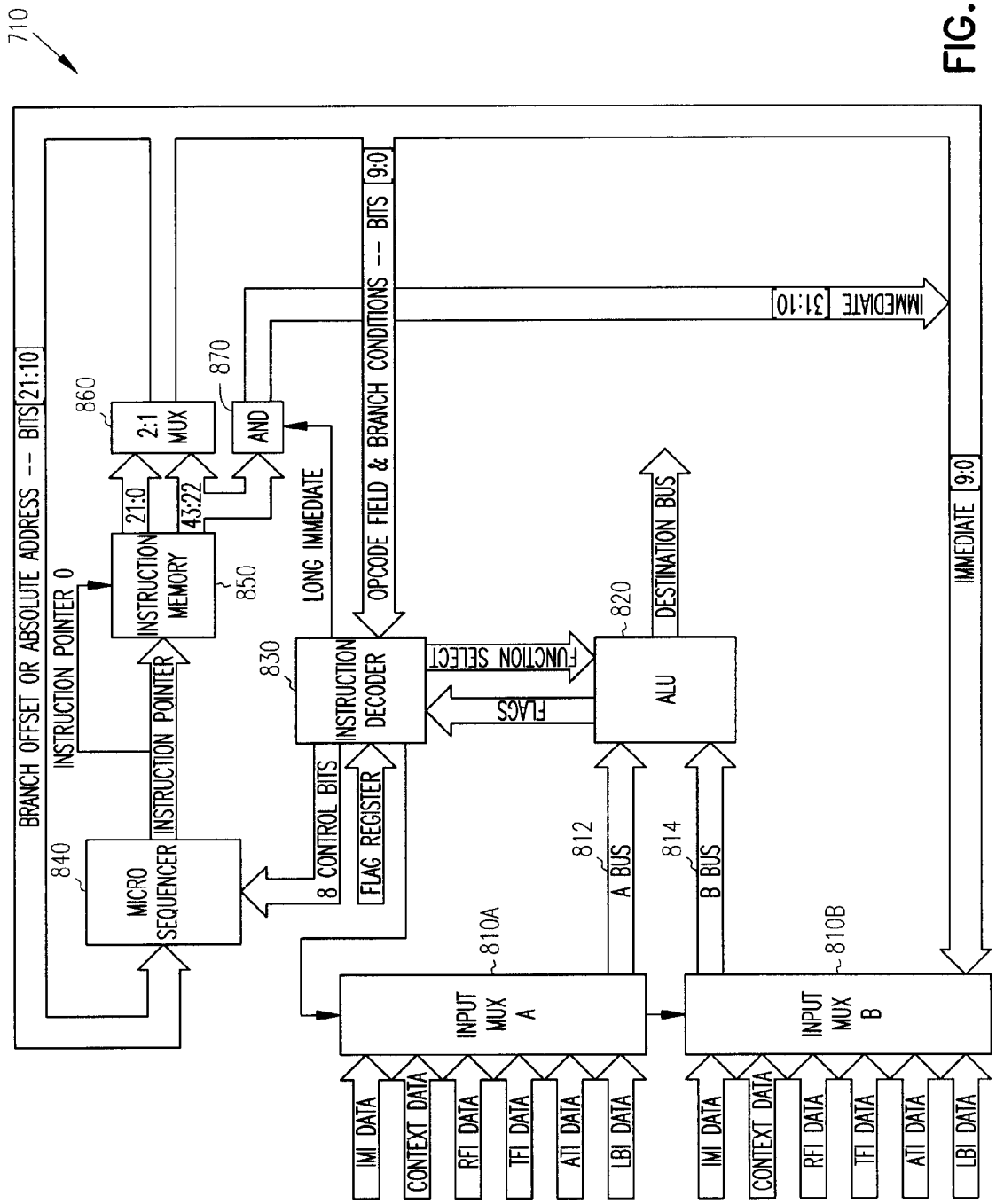
FIG. 9 illustrates an example implementation of a Micro-Engine (ME) of a host-fabric adapter according to an embodiment of the present invention.

One example implementation of the data MUXs 810, the Arithmetic Logic Unit (ALU) 820, the Instruction Decoder 830, the Micro-Sequencer 840, and the Instruction Memory 850 of an example Micro-Engine (ME) 710 may be described with reference to FIG. 9 hereinbelow:

Data MUX 810: There may be two input data MUXs, input MUX-A 810A and input MUX-B 810B which supply two 32-bit buses (A-bus and B-bus) inputs to the ALU 820. The A-bus 812 may supply data based on decode of the destination field of the ME instruction to the ALU 820. Likewise, the B-bus 814 may supply data based on decode of the source field of the ME instruction to the ALU 820. The data inputs to the input data MUXs 810A and 810B may be supplied by external interface blocks such as the host interface 712, the address translation interface 714, the VI context memory 716, the local bus interface 718, the completion queue/doorbell manager interface 720, and the first-in/first-out (FIFO) interface 722 needed to control many ME functions. The input MUX-B 810B may include Immediate Data from the ME instruction, via 2:1 Multiplexer (MUX) 860 and logic AND gate 870. The decode of the destination/source field, which generate the selects for the input MUX-A 810A and MUX-B 810B, may be executed by the Instruction Decoder 830.

Arithmetic Logic Unit (ALU) 820: The ALU 820 may contain two (A and B) 32-bit data inputs and perform functions that are based on the OpCode field of the ME instruction. The functions supported include, but are not limited to, Add, Subtract, OR, XOR, AND, Compare, Rotate Right, Shift Left, Bit test and Move (pass through). The Instruction Decoder 830 decodes the ME instruction and provides the function select signals to the ALU 820. After executing the selected function, the ALU 820 sets flags based on the outcome. The flags may include, for example, Zero and Carry. If the result of an arithmetic function is zero, the Z flag may be set. In contrast, if the arithmetic function results in a carry out, the C flag may be set. Results of ALU functions may affect the state of the Z flag.

Instruction Memory 850: The Instruction Memory 850 may be a static random-access-memory SRAM provided to store MicroCode for providing ME instructions via 2:1 Multiplexer (MUX) 860 and logic AND gate 870. MicroCode may be downloadable into the SRAM for changes in future NGIO/InfiniBand™ specification enhancements. The SRAM may contain 2K×44 bits and may be loaded via the local bus. Each ME instruction may be 22 bits, for example, and two instructions may be allowed for each word of SRAM. Instructions with 32 bit Immediate Data occupy 44 bits, counting as two instructions. The MicroCode supplied by the SRAM may be available in different code formats.

Micro-Sequencer 840: The Micro-Sequencer 840 may determine the address sequence of the Micro-Engine (ME) 710 from the decode of the ME instruction and Flag register information. The next address sequence may be controlled by the Instruction Decoder 830 which passes 8 bits of Control Field information (i.e., 8 Control Field signals) to the Micro-Sequencer 840.

Major challenges implementing a host-fabric adapter as shown in FIG. 7 are to maximize performance of the Micro-Engine (ME) 710 and to efficiently use ME resources in processing NGIO/InfiniBand™ cells. Typically the host interface 712 reads and writes data from the host memory 206 (see FIG. 6). The Micro-Engine (ME) 710 executes MicroCode which issues requests for host transactions so as to transmit or receive NGIO/InfiniBand™ cells. Host transactions which consist of host requests and the corresponding host responses must be efficiently executed by the Micro-Engine (ME) 710 to maximize ME performance. Usually however, the Micro-Engine (ME) 710 issues host data requests necessary to build a cell, and then waits until all the host responses have completed. After the requests have completed, the Micro-Engine (ME) 710 then issues an End of Cell (EOC) indicator, which indicates the cell is ready for transmission, as described with reference to FIG. 3, via the serial interface 730.

Figure 10:
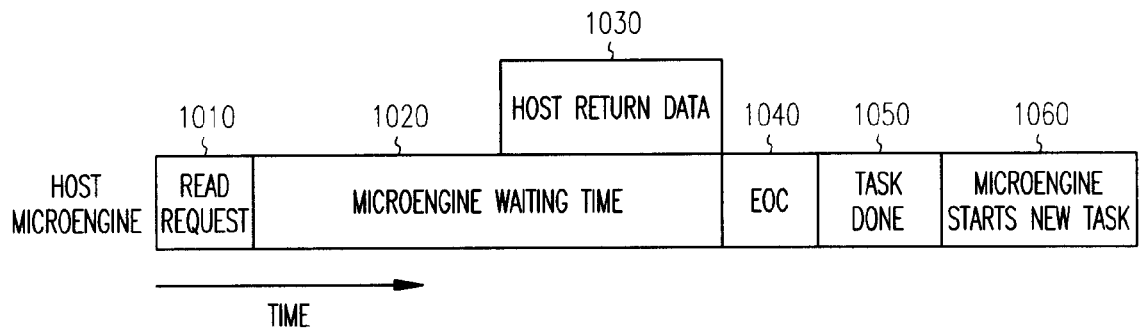
FIG. 10 illustrates a typical sequence of a host transaction between a Micro-Engine (ME) and a host interface of the host-fabric adapter.

FIG. 10 illustrates an example sequence of a host transaction between the Micro-Engine (ME) 710 and the host interface 712 of the micro-controller subsystem 700. First, the Micro-Engine (ME) 710 sends a request which may be in a form of a read request 1010 to the host interface 712. Request information may contain an address and length of host data needed from the host memory 206 (see FIG. 6) to built a cell, for example. The Micro-Engine (ME) 710 then waits during a waiting time 1020 until the host return data (cell payload data) is fetched from the host memory 206 via the host interface 712. After all the host data is returned, the Micro-Engine (ME) 712 issues to the FIFO interface 722 an End-Of-Cell (EOC) indicator which indicates that the cell (cell header) has been built, and a Task Done command which indicates that the task has been completed. The host interface 712 then sends that cell (cell payload data) down to the serial interface 730. Afterwards, the Micro-Engine (ME) 710 may start a new task. This type of host transaction is, however, inefficient because the host transaction is typically the last thing that must occur before the cell is ready to be transmitted, and can take over one (1) microsecond to complete, leaving the Micro-Engine (ME) idle for a long period of time.

Figure 12:
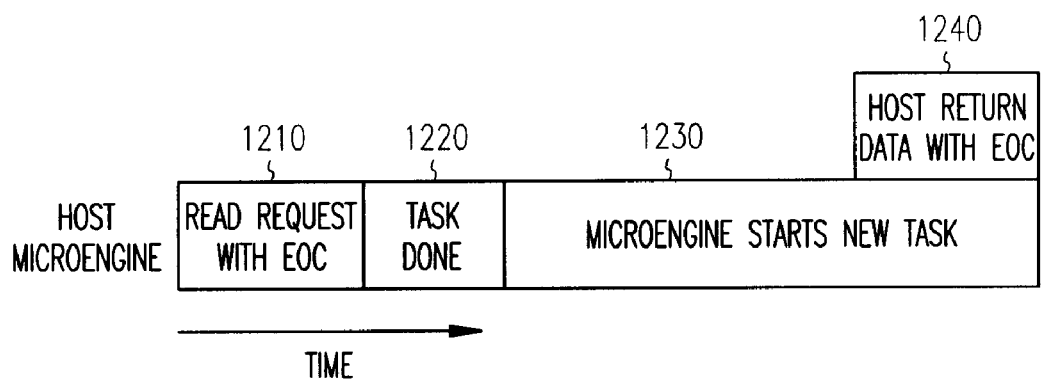
FIG. 12 illustrates an example sequence of a host transaction between a Micro-Engine (ME) and a host interface of the host-fabric adapter using an End-Of-Cell (EOC) indicator feature according to an embodiment of the present invention.

Referring now to FIG. 11, an example host interface and Micro-Engine (ME) interaction using an End-Of-Cell (EOC) indicator feature according to an embodiment of the present invention is illustrated. Likewise, FIG. 12 illustrates an example sequence of a host transaction between a Micro-Engine (ME) and a host interface of the host-fabric adapter using an End-Of-Cell (EOC) indicator feature according to an embodiment of the present invention. An End-Of-Cell (EOC) indicator may be included as part of the host request issued from the Micro-Engine (ME) 710 to the host interface 712 so that the Micro-Engine (ME) 710 can eliminate the Micro-Engine (ME) waiting time and start a new task immediately. This way the Micro-Engine (ME) 710 does not have to monitor the host transaction, wait for the host data (cell payload) to return from the host interface 712, and issue an additional command when the host transaction is completed.

As shown in FIG. 11, a single cell buffer 1100 in a form of one-cell FIFO may be utilized between the FIFO interface 722 and the serial interface 730 to temporarily store a data cell 300 as shown in FIG. 3 having a header 312 which is built by the Micro-Engine (ME) 710 and data cell payload 314 which is fetched from the host memory 206 (see FIG. 6) for subsequent transmission via the serial interface 730. The Micro-Engine (ME) 710 issues a read request 1210 as shown in FIG. 12 to request host data from the host memory 206 (see FIG. 6), via the host interface 712. The read request 1210 may include an address and length of host data to be fetched from host memory 206 (see FIG. 6), and an End-Of-Cell (EOC) indicator which indicates that the cell (cell header) has been built. If the host transaction is the last one for the cell, the Micro-Engine (ME) 710 uses a command that sets the End-Of-Cell (EOC) indicator true. After the End-Of-Cell (EOC) indicator is issued along with the read request 1210 to the host interface 712, the Micro-Engine (ME) 710 issues a Task Done command 1220 which indicates that the task has been completed, and immediately starts a new task 1230, for example, building a next cell, without having to wait for host data (cell payload data) to return from the host interface 712.

When the host response comes back from the host interface 712, the End-Of-Cell (EOC) indicator may be returned along with the host data 1240 from the host interface 712 to the cell buffer 1100. If the End-Of-Cell (EOC) indicator is true, the cell buffer 1100 recognizes that the data cell 300 (see FIG. 3) is ready to be transmitted without an additional command from the Micro-Engine (ME) 710, and allows the data cell to go to the serial interface 730 without Micro-Engine (ME) intervention. As a result, ME performance can be maximized and a higher cell throughput can be obtained, since the Micro-Engine (ME) 710 is now free from having to monitor the host transaction, wait for the host data (cell payload) to return from the host interface 712, and then use ME resources to issue an additional command when the host transaction is completed. In addition, since the host transaction may take over 1 microsecond to complete, and some full-sized cells can be processed in about 800 clocks, the use of host transaction with End-Of-Cell (EOC) indicator can save over 125 clocks and increase ME performance up to 20%.

Another solution to maximize performance of the Micro-Engine (ME) 710 of the micro-controller subsystem 700 and to efficiently use ME resources in processing NGIO/InfiniBand™ multiple cells simultaneously is the use of a negative acknowledgment (NACK) feature to control the scheduled function sequence of a multitasking Micro-Engine (ME) 710. Typically a Scheduler provides an interface to the VI context memory interface 716, the local bus interface 718 and the completion queue/doorbell manager interface 720 for scheduled functions. Such a Scheduler may be responsible for scheduling the next Virtual Interface (VI) to the context manager of the VI context manager interface 716 for different threads of operation based on priority. Usually, the Scheduler sends a request for a specific VI directly to the Micro-Engine (ME) 710. However, if the VI is currently being worked on by the Micro-Engine (ME) 710 from a previous request, the Micro-Engine (ME) 710 can not accept the new request until the previous request is processed. This, in turn, causes the Scheduler and available tasks of the Micro-Engine (ME) to sit undesirably idle until the previous request processing is completed.

Figure 13:
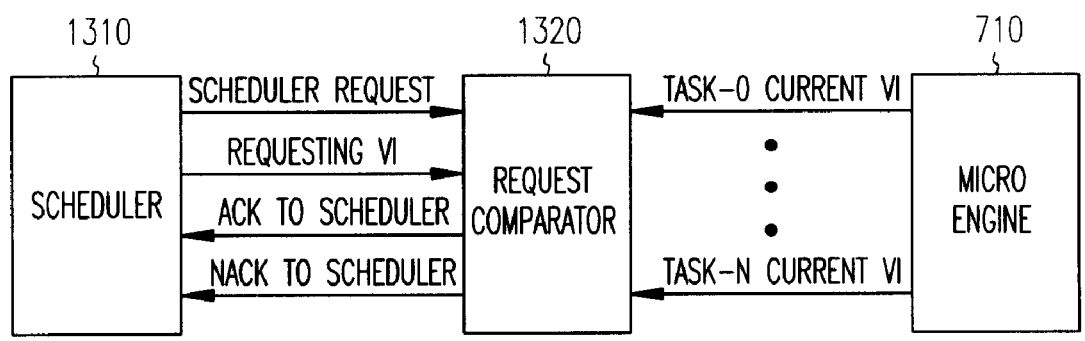
FIG. 13 illustrates an example Scheduler and Micro-Engine (ME) interaction using a negative acknowledgment (NACK) feature according to an embodiment of the present invention.

FIG. 13 illustrates an example Scheduler and Micro-Engine (ME) interaction using a negative acknowledgment (NACK) feature according to an embodiment of the present invention. As shown in FIG. 13, in addition to the Scheduler 1310, a Request Comparator 1320 may be utilized to a feedback, in a form of a negative acknowledgment (NACK), from the Micro-Engine (ME) 710 to the Scheduler 1310 informing the Scheduler 1310 to skip this particular VI and supply the next VI needing processing. This way idle time in the Micro-Engine (ME) 710 is significantly reduced and forward progress of scheduled functions can be advanced. In addition, negative acknowledgment (NACK) advantageously allows an efficient use of ME resources in processing multiple VI cells simultaneously.

More specifically, the Scheduler 1310 sends a scheduler request and a requesting VI number to the Micro-Engine (ME) 710 for work on a specific VI, via the Request Comparator 1320. The Request Comparator 1320 checks the current task, for example, from Task-0 Current VI to Task-N Current VI, that is being worked on by the Micro-Engine (ME) 710, determines whether to accept the scheduler request with an acknowledgment (ACK) or not accept the scheduler request with a negative acknowledgment (NACK) to the Scheduler 1310. Negative acknowledgment (NACK) is utilized to inform the Scheduler 1310 that the Micro-Engine (ME) 710 is currently working on the request VI, and therefore, cannot accept the scheduler request but asks for a new scheduler request for a different VI from the Scheduler 1310.

If the first scheduler request is for a specific VI0, for example, the Request Comparator 1320 accepts the request by issuing an ACK back to the Scheduler 1310, and then passes the request to the Micro-Engine (ME) 710 to process VI0. While the Micro-Engine (ME) 710 is processing VI0, another request from the Scheduler 1310 may be issued for VI0. The Request Comparator 1320 compares the requesting VI with the VI that the Micro-Engine (ME) 710 is currently working on. In this example VI0 matches. If NACKing is not available, the Scheduler 1310 maintains its request for the second VI0 and is, in effect, stalled until the Micro-Engine (ME) 710 completed processing of the first request for VI0. Multitasking capabilities of the ME, which are available to do work, may be idle.

In contrast, since NACKing is available, the Request Comparator 1320 asks for the second VI0 request by issuing a NACK. The Scheduler 1310 then receives the NACK and reissues a scheduler request for another VI (VI1 in the example). The request for VI1 is compared and does not match with what the Micro-Engine (ME) 710 is working on (VI0). The Request Comparator 1320 then issues an ACK for VI1 while the Micro-Engine (ME) 710 starts processing the request.

FIGS. 14A–14E illustrate an example timing diagram of the scheduler and Micro-Engine (ME) interaction according to an embodiment of the present invention. FIG. 14A illustrates a clock cycle for each request whether acknowledged (ACKed) or negative acknowledged (NACKed); FIG. 14B illustrates a Scheduler Request sequence; FIG. 14C illustrates requesting VI sequence; FIG. 14D illustrates an acknowledgment (ACK) to the Scheduler 1310 while FIG. 14E illustrates a negative acknowledgment (NACK) to the Scheduler 1310. The Scheduler 1310 asserts the request as shown in FIG. 14B, and supply the requesting VI number as shown in FIG. 14C. In response thereto, the Request Comparator 1320 may issue either an acknowledgment ACK as shown in FIG. 14D if that VI number is not being worked on by the Micro-Engine (ME) 710, or a negative acknowledgment NACK as shown in FIG. 14E if that VI number is currently being worked on by the Micro-Engine (ME) 710. As previously indicated, NACKing allows an efficient use of ME resources in processing multiple VI cells simultaneously.

As described from the foregoing, the host-fabric adapter installed at a host system in a data network using a channel-based, switched fabric architecture according to an embodiment of the present invention effectively manages NGIO/InfiniBand™ channels and support data movement operations between communication devices at a host system or between host systems connected together directly or via a data network using a channel-based, switched fabric architecture. The host-fabric adapter is optimized for NGIO/InfiniBand™ functionality with minimal hardware investment, including controlling execution of NGIO/InfiniBand™ protocols with minimal pipelining and NGIO/InfiniBand™ cell data processing with minimal cell latency. Micro-control subsystem of the host-fabric adapter is designed to control execution of NGIO/InfiniBand™ protocols with minimal pipelining, and to control overall NGIO/InfiniBand™ cell processing with minimum cell latency. Control cycle and data cycle are pipelined to advantageously allow single cycle ME instruction execution in order to reduce the number of ME instructions needed to process NGIO/InfiniBand™ cells with minimum latency.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the present invention is applicable to all types of data networks, including, but is not limited to, a local area network (LAN), a wide area network (WAN), a campus area network (CAN), a metropolitan area network (MAN), a global area network (GAN) and a system area network (SAN) using Next Generation I/O (NGIO), Future I/O (FIO) and Server Net, and a LAN system including Ethernet, FDDI (Fiber Distributed Data Interface) Token Ring LAN, Asynchronous Transfer Mode (ATM) LAN, Fiber Channel, and Wireless LAN. Further, many other modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A host-fabric adapter installed at a host system for connecting to a switched fabric of a data network, comprising:

a host interface which reads and writes data from a host memory of the host system;

a serial interface which receives and transmits data from said switched fabric; and a Micro-Engine (ME) operatively coupled to the host interface and operatively coupled to the serial interface, wherein said Micro-Engine (ME) issues a host request to said host interface for a host transaction including an address and length of host data to be fetched from said host memory, and an End-Of-Cell (EOC) indicator which indicates that a cell has been built for transmission via said serial interface, and which starts working on a different task without waiting for the corresponding host response of the host request from said host interface.

2. The host-fabric adapter as claimed in claim 1, wherein each host transaction consists of a host request from said Micro-Engine (ME) and the corresponding host response from said host interface.

3. The host-fabric adapter as claimed in claim 1, further comprising a cell buffer arranged between said Micro-Engine (ME) and said serial interface to receive the corresponding host response of the host request from said host interface including host data fetched from said host memory and said End-Of-Cell (EOC) indicator, which, when activated, indicates a state of readiness for transmission to said switched fabric, via said serial interface, without intervention from said Micro-Engine (ME).

4. The host-fabric adapter as claimed in claim 1, wherein said cell buffer is a single cell first-in/first-out (FIFO) storage device.

5. The host-fabric adapter as claimed in claim 1, wherein said Micro-Engine (ME) issues a Task Done command which indicates that the task is completed immediately after issuing said host request, and starts said different task after issuing said Task Done command.

6. The host-fabric adapter as claimed in claim 1, further comprising:

an address translation interface provides an interface for address translation, and which is addressable by write data and system controls from said Micro-Engine (ME), via a system data bus and a system control bus;

a context memory interface which provides an interface to a context manager, and which is addressable by write data and system controls from said Micro-Engine (ME), via said system data bus and said system control bus, for providing the necessary context for a work queue pair (WQP) used for sending and receiving data packets;

a local bus interface which provides an interface to a local bus, and which is addressable by write data and system controls from said Micro-Engine (ME), via said system data bus and said system control bus, for supporting system accessible context connections and data transfer operations;

a completion queue/doorbell manager interface which provides an interface to completion queues, and doorbell and memory registration rules, and which is addressable by write data and system controls from said Micro-Engine (ME), via said system data bus and said system control bus; and a first-in/first-out (FIFO) interface which provides an interface to said switched fabric via said serial interface, and which is addressable by write data and system controls from said Micro-Engine (ME), via said system data bus and said system control bus, for enabling exchange of requests and/or data packets from said switched fabric.

7. The host-fabric adapter as claimed in claim 6, wherein said Micro-Engine (ME) comprises:

one or more Data Multiplexers arranged to supply appropriate interface data based on an ME instruction;

an Instruction Memory arranged to provide said ME instruction based on downloadable microcode;

an Arithmetic Logic Unit (ALU) arranged to perform mathematical, logical and shifting operations, and supply write data to the host interface, the address translation interface, the VI context memory interface, the local bus interface, the completion queue/doorbell manager interface and the FIFO interface, via said system write data bus; and an Instruction Decoder arranged to supply system controls to the host interface, the address translation interface, the context memory interface, the local bus interface, the completion queue/doorbell manager interface and the FIFO interface, via said system control bus, to execute said ME instruction from said Instruction Memory to control operations of said Data Multiplexers, and to determine functions of said Arithmetic Logic Unit (ALU).

8. The host-fabric adapter as claimed in claim 7, wherein said ME instruction includes an OpCode field used to control said Arithmetic Logic Unit (ALU), and a destination field and a source field used to control operation of one or more Data Multiplexers.

9. The host-fabric adapter as claimed in claim 7, wherein said one or more Data Multiplexers supply two parallel 32-bit buses (A-bus and B-bus) data inputs based on decode of the destination field and the source field of each ME instruction from the host interface, the address translation interface, the context memory interface, the local bus interface, the completion queue/doorbell manager interface, and the FIFO interface to said Arithmetic Logic Unit (ALU).

10. The host-fabric adapter as claimed in claim 7, wherein said Arithmetic Logic Unit (ALU) performs functions that are based on the OpCode field of each ME instruction, including, but are not limited to, Add, Subtract, OR, XOR, AND, Compare, Rotate Right, Shift Left, Bit test and Move (pass through) operations, and said Instruction Decoder decodes said ME instruction and provides function select signals to said Arithmetic Logic Unit (ALU) to perform selected ME functions.

11. The host-fabric adapter as claimed in claim 7, wherein said Instruction Memory corresponds to a static random-access-memory (SRAM) provided to store microcode that are downloadable for providing said ME instruction to said Instruction Decoder.

12. The host-fabric adapter as claimed in claim 1, wherein said host interface, said serial interface and said Micro-Engine (ME) are configured in accordance with the "*Virtual Interface (VI) Architecture Specification*", the "*Next Generation Input/Output (NGIO) Specification*" and the "*Infini-Band™ Specification*".

13. A host-fabric adapter installed at a host system for connecting to a switched fabric of a data network, comprising:

a Micro-Engine (ME) arranged to work on multiple tasks based on a Virtual Interface (VI) to support data transfers via said switched fabric;

a Scheduler arranged to supply a request and a request VI number to said Micro-Engine (ME) for work; and a Request Comparator operatively coupled to said Micro-Engine (ME) and operatively coupled to said Scheduler, said Request Comparator arranged to check the current VI that is being worked on by said Micro-Engine (ME), and to generate an acknowledgment ACK or a negative acknowledgment NACK to said Scheduler depending upon whether the request VI number is currently being worked on by said Micro-Engine (ME);

a host interface which provides an interface to said host system, and which is addressable by write data and system controls from said Micro-Engine (ME), via a system data bus and a system control bus;

a serial interface which receives and transmits data from said switched fabric;

an address translation interface provides an interface for address translation, and which is addressable by write data and system controls from said Micro-Engine (ME), via a system data bus and a system control bus;

a context memory which provides an interface to a context manager, and which is addressable by write data and system controls from said Micro-Engine (ME), via said system data bus and said system control bus, for providing the necessary context for a work queue pair (WQP) used for sending and receiving data packets;

a local bus interface which provides an interface to a local bus, and which is addressable by write data and system controls from said Micro-Engine (ME), via said system data bus and said system control bus, for supporting system accessible context connections and data transfer operations;

a completion queue/doorbell manager interface which provides an interface to completion queues, and doorbell and memory registration rules, and which is addressable by write data and system controls from said Micro-Engine (ME), via said system data bus and said system control bus; and a first-in/first-out (FIFO) interface which provides an interface to said switched fabric via said serial interface, and which is addressable by write data and system controls from said Micro-Engine (ME), via said system data bus and said system control bus, for enabling exchange of requests and/or data packets from said switched fabric, wherein each of said host interface, said serial interface, said address translation interface, said context memory, said local bus interface, said completion queue/doorbell manager interface, and said first-in/first-out (FIFO) interface are operatively coupled to said Micro-Engine (ME).

14. The host-fabric adapter as claimed in claim 13, wherein said Micro-Engine (ME) comprises:

one or more Data Multiplexers arranged to supply appropriate interface data based on an ME instruction;

an Instruction Memory arranged to provide said ME instruction based on downloadable microcode;

an Arithmetic Logic Unit (ALU) arranged to perform mathematical, logical and shifting operations, and supply write data to the host interface, the address translation interface, the VI context memory interface, the local bus interface, the completion queue/doorbell manager interface and the FIFO interface, via said system write data bus; and an Instruction Decoder arranged to supply system controls to the host interface, the address translation interface, the VI context memory interface, the local bus interface, the completion queue/doorbell manager interface and the FIFO interface, via said system control bus, to execute said ME instruction from said Instruction Memory to control operations of said Data Multiplexers, and to determine the functions of said Arithmetic Logic Unit (ALU).

15. The host-fabric adapter as claimed in claim 14, wherein said ME instruction includes an OpCode field used to control said Arithmetic Logic Unit (ALU), and a destination field and a source field used to control operation of one or more Data Multiplexers.

16. The host-fabric adapter as claimed in claim 14, wherein said one or more Data Multiplexers supply two parallel 32-bit buses (A-bus and B-bus) data inputs based on decode of the destination field and the source field of each ME instruction from the host interface, the address translation interface, the VI context memory interface, the local bus interface, the completion queue/doorbell manager interface, and the FIFO interface to said Arithmetic Logic Unit (ALU).

17. The host-fabric adapter as claimed in claim 14, wherein said Arithmetic Logic Unit (ALU) performs functions that are based on the OpCode field of each ME instruction including, but are not limited to, Add, Subtract, OR, XOR, AND, Compare, Rotate Right, Shift Left, Bit test and Move (pass through) operations, and said Instruction Decoder decodes said ME instruction and provides function select signals to said Arithmetic Logic Unit (ALU) to perform selected ME functions.

18. The host-fabric adapter as claimed in claim 14, wherein said Instruction Memory corresponds to a static random-access-memory (SRAM) provided to store microcode that are downloadable for providing said ME instruction to said Instruction Decoder.

19. The host-fabric adapter as claimed in claim 13, wherein said host interface, said serial interface and said Micro-Engine (ME) are configured in accordance with the "*Virtual Interface (VI) Architecture Specification*", the "*Next Generation Input/Output (NGIO) Specification*" and the "*InfiniBand™ Specification*".

20. A host-fabric adapter, comprising:

a host interface arranged to interface a host memory of a host system;

a serial interface arranged to receive and transmit data from a switched fabric;

a Micro-Engine (ME) operatively coupled to the host interface and operatively coupled to the serial interface, wherein said Micro-Engine (ME) is arranged to work on multiple tasks based on a Virtual Interface (VI) to support data transfers via said switched fabric, and configured to issue a host request to said host interface for a host transaction including an address and length of host data to be fetched from said host memory, and an End-Of-Cell (EOC) indicator which indicates that a cell has been built for transmission via said serial interface, and to begin working on a different task without waiting for the corresponding host response of the previous host request from said host interface;

a Scheduler arranged to supply a request and a request VI number to said Micro-Engine (ME) for work; and a Request Comparator operatively coupled to said Micro-Engine (ME) and operatively coupled to said Scheduler, said Request Comparator arranged to check the current VI that is being worked on by said Micro-Engine (ME), and to generate an acknowledgment ACK or a negative acknowledgment NACK to said Scheduler depending upon whether the request VI number is currently being worked on by said Micro-Engine (ME).

21. The host-fabric adapter as claimed in claim 20, wherein said Scheduler generates said acknowledgment ACK to accept the request from said Scheduler if the request VI number is not being worked on by said Micro-Engine (ME).

22. The host-fabric adapter as claimed in claim 20, said Scheduler generates said negative acknowledgment NACK not to accept the request from said Scheduler if the request VI number is being worked on by said Micro-Engine (ME).

23. The host-fabric adapter as claimed in claim 20, wherein each host transaction consists of a host request from said Micro-Engine (ME) and the corresponding host response from said host interface.

24. The host-fabric adapter as claimed in claim 20, further comprising a cell buffer arranged between said Micro-Engine (ME) and said serial interface to receive the corresponding host response of the previous host request from said host interface including host data fetched from said host memory and said End-Of-Cell (EOC) indicator, which, when activated, indicates a state of readiness for transmission to said switched fabric, via said serial interface, without intervention from said Micro-Engine (ME).

25. The host-fabric adapter as claimed in claim 20, wherein said cell buffer is a single cell first-in/first-out (FIFO) storage device.

26. The host-fabric adapter as claimed in claim 20, wherein said Micro-Engine (ME) issues a Task Done command which indicates that the task is completed immediately after issuing the host request, and starts working on a different task after issuing said Task Done command.

27. The host-fabric adapter as claimed in claim 20, wherein said data transfers are supported by the *"Virtual Interface (VI) Architecture Specification"*, the *"Next Generation Input/Output (NGIO) Specification"* and the *"InfiniBand™ Specification"*.

* * * * *